F. M. COLE.
Carding Machine.
No. 233,206. Patented Oct. 12, 1880.
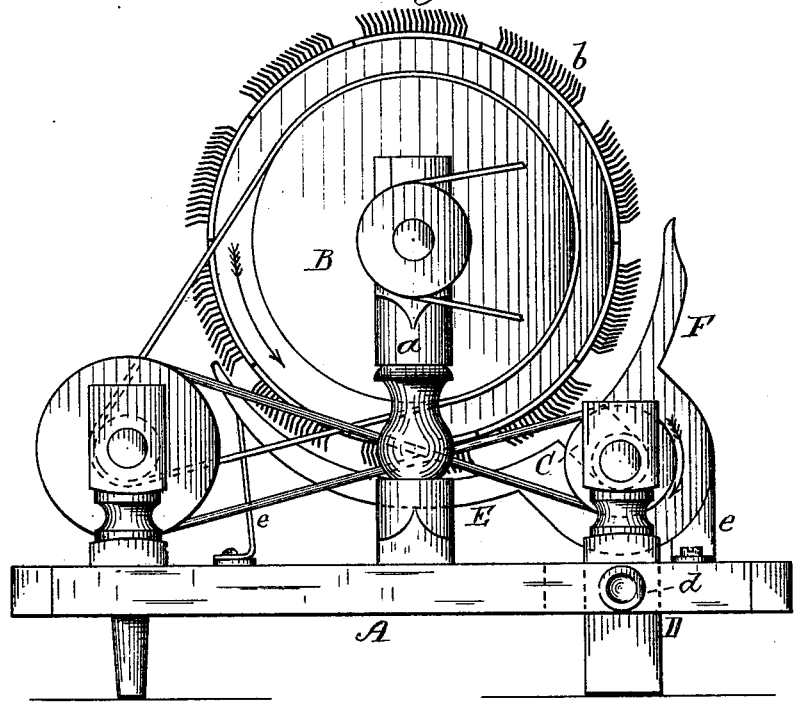
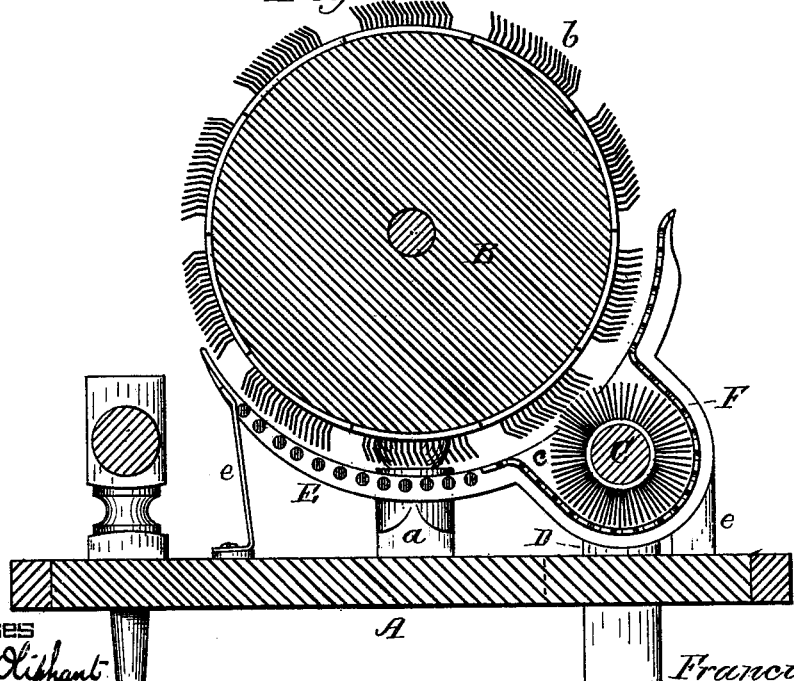
Witnesses
Nat. E. Oliphant
Geo. R. Porter.
Inventor
Francis M. Cole,
per Chas. H. Fowler,
Attorney.

UNITED STATES PATENT OFFICE.

FRANCIS M. COLE, OF MILFORD, NEW HAMPSHIRE.

CARDING-MACHINE.

SPECIFICATION forming part of Letters Patent No. 233,206, dated October 12, 1880.

Application filed November 18, 1879.

*To all whom it may concern:*

Be it known that I, FRANCIS M. COLE, of Milford, in the county of Hillsborough and State of New Hampshire, have invented a new and valuable Improvement in Carding-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation. Fig. 2 is a central vertical section thereof.

This invention has relation to carding-machines for cotton or wool; and it consists in the combination of carding and stripping cylinders, a grating beneath the carding-cylinder, and a screen projecting from said grating and extending around said stripping-cylinder, and then upwardly above the axis of the carding-cylinder, as will be hereinafter more fully described, and subsequently pointed out in the claim.

In the accompanying drawings, A represents the bed or frame of the machine provided with standards $a$, to which is journaled the main carding-cylinder B, of the usual construction, and having upon its periphery wires $b$. On a line below the axis of the cylinder B is a small cylinder, C, having secured to its periphery straight fancy wires $c$. This cylinder C has its bearings in boxes D, said boxes being vertically and horizontally adjustable, for the purpose of bringing the cylinder C toward the cylinder B, to compensate for the wear of the wires, and also to regulate the degree with which the wires C are to be brought in contact with the wires $b$ of the cylinder B. The means shown of rendering the cylinder both vertically and horizontally adjustable consists simply in forming elongated openings in the frame of the machine, through which pass the boxes D, thus admitting of their being moved in the openings in a horizontal direction at right angles to the axis of rotation of the cylinder B, and at the same time being capable of a vertical adjustment within the openings, and held in the position required by a set-screw, $d$. No novelty, however, is claimed in the rendering of the cylinders adjustable.

Both the cylinders B and C are caused to rotate by suitable belts and pulleys in the directions indicated by the arrows, the small cylinder C rotating with double the rapidity of the cylinder B, the wires upon the cylinders slightly touching each other while rotating.

Secured to the bed or frame A of the machine, directly under the cylinder B, is the usual grating E, and from said grating, in a direction toward the cylinder C, projects a screen, F. This screen, which may be composed of either perforated sheet metal or wire-gauze, passes around the outer portion of the cylinder C and extends upward above the axis of the cylinder B. The screen F allows the air and dust to pass outward, still retaining the cotton that the stripper throws off the main cylinder B and distributing it evenly in its passage onward, the cylinder C cleaning the cylinder B of the seed and dirt lodged in the wires or teeth thereof, and thus keeping it clean and in working order.

Having now fully described my invention, what I claim as new, and desire to secure by Letters Patent, is—

The combination of the cylinders B and C, the grating E, secured to the bed of the machine, and the screen F, projecting from said grating and extending around the cylinder C, and then upwardly above the axis of the cylinder B, substantially as and for the purpose set forth.

In testimony that I claim the above I have hereunto subscribed my name in the presence of two witnesses.

FRANCIS M. COLE.

Witnesses:
 JOSEPH M. SMITH,
 F. T. SANGER.